United States Patent [19]

Berkovich et al.

[11] Patent Number: 5,295,257
[45] Date of Patent: Mar. 15, 1994

[54] DISTRIBUTED MULTIPLE CLOCK SYSTEM AND A METHOD FOR THE SYNCHRONIZATION OF A DISTRIBUTED MULTIPLE SYSTEM

[75] Inventors: Simon Y. Berkovich, Rockville; Steven A. Haaser; Henry C. Yee, both of Columbia; Chris J. Walter, Ellicott City, all of Md.

[73] Assignee: AlliedSignal Inc., Morris Township, Morris County, N.J.

[21] Appl. No.: 705,460

[22] Filed: May 24, 1991

[51] Int. Cl.$^5$ .................................................. G06F 1/12
[52] U.S. Cl. ................................................... 395/550
[58] Field of Search ................. 395/550; 307/269, 219; 375/107, 118, 119, 120; 371/36

[56] References Cited

U.S. PATENT DOCUMENTS

| | | | |
|---|---|---|---|
| 4,239,982 | 12/1980 | Smith et al. | 307/219 |
| 4,519,034 | 5/1985 | Smith et al. | 395/550 |
| 4,531,185 | 7/1985 | Halpren et al. | 395/550 |
| 4,680,779 | 7/1987 | Wakerly | 375/107 |
| 4,746,920 | 5/1988 | Nellen et al. | 340/825.14 |
| 4,779,008 | 10/1988 | Kessels | 307/269 |
| 4,984,241 | 1/1991 | Truong | 371/36 |
| 5,036,528 | 7/1991 | Costantino et al. | 375/119 |
| 5,086,500 | 2/1992 | Greub | 395/550 |
| 5,117,442 | 5/1992 | Hall | 375/107 |

*Primary Examiner*—Dale M. Shaw
*Assistant Examiner*—Sang Hui Kim
*Attorney, Agent, or Firm*—Howard G. Massung

[57] ABSTRACT

A method for synchronizing a distributed multiple clock system in which the first clock to reach a first predetermined number of counts generates a polling request signal. The remaining clocks compare the content of their counters to determine if they are in synchronization with the clock that generated the polling request signal. Each clock will place itself inactive if it determines it is out of synchronization with the active clocks. The first active clock to reach a second predetermined number of counts will generate a synchronization interrupt signal which resets a counter in each clock to zero. A start subroutine readmits inactive clocks when after a synchronization interrupt signal is generated its counts are within a predetermined readmittance range or its counter counts up to a third predetermined value.

25 Claims, 3 Drawing Sheets

DISTRIBUTED MULTIPLE CLOCK SYSTEM AND A METHOD FOR THE SYNCHRONIZATION OF A DISTRIBUTED MULTIPLE SYSTEM

BACKGROUND OF THE INVENTION

1. Field of the Invention

The invention is related to distributed clock systems and, in particular, to a method for synchronizing a distributed multiple clock system in a fault tolerant manner.

2. Prior Art

Various methods for synchronizing distributed clock systems are known in the art. Avsan et al, in U.S. Pat. No. 3,761,884, discloses a synchronization method in which all of the clocks in the system are reset when the fastest clock reaches a predetermined count. In contrast Smith, in U.S. Pat. No. 3,932,847, teaches a time-of-day clock synchronization system in which each out-of-sync clock is detected, then restarted using a synchronization program to be in sync with a selected one of the clocks that are in synchronization. Alternatively, Whiteside, in U.S. Pat. No. 4,330,826, discloses a synchronization system in which synchronizer modules receive sampling number messages from a plurality of computers. A find sampling number agreement module generates a voted sampling number and a sampling period timer is adjusted to synchronize its period with the voted sampling number Jensen et al, in U.S. Pat. No. 4,229,792, discloses a synchronization system in which each received message has a time slot number which is compared with the current time slot number of the receiving unit to establish synchronization. Further, Glenn et al in U.S. Pat. No. 4,392,196 discloses a synchronization system in which a time window is generated by a time alignment controller and, if the local pseudo time accumulator of each clock is within the time window, it is allowed to operate.

Each of these systems have particular advantage for particular application. For example, the synchronization system taught by Whiteside et al is for a fault tolerant multiple computer system and therefore synchronization also has to be fault tolerant. Synchronization is achieved by voting to obtain an average time value. Then the clock in all of the computers in the system are reset in accordance with the voted time value. Disclosed herein is a synchronization system for distributed clock which has no central clock, is fault tolerant and can achieve synchronization from any initial state.

SUMMARY OF THE INVENTION

The invention is a fault tolerant distributed clock system in which each individual clock has means for generating clock pulses, means for generating polling request signals in response to the generation of a first predetermined number of clock pulses, means for generating a difference number equal to the difference between the first predetermined number and the number of clock pulses generated, and means for generating a polling result signal indicating that it is out of synchronization with the clock that generated the polling request signal when the difference number exceeds a predetermined reference value. The clock also includes means for placing itself inactive in response to the difference number being equal to zero and more than one other clock in the system generating a polling result signal, or the difference number being greater than the reference number and only one clock generating a polling result signal, and means for cancelling prior polling request and polling result signals when the clock remains active and the number of polling result signals is not equal to zero. The clock further includes means for generating a synchronization interrupt signal signifying the end of the current clock period when the clock has an active status and the count in the first counter is equal to a second predetermined number. Start means responsive to the generation of said synchronization interrupt signal are provided to initialize the polling request and polling result counter of the active clocks to begin a new clock period. Means are also provided to readmit each faulty clock when the count in the first counter immediately after the generation of a synchronization interrupt signal is between predetermined readmittance limits or when the counter reaches a third predetermined number of counts. The first counter is preferably a module M-counter which rolls over zero counts when it reaches the third predetermined number of counts. The generation of the polling request, polling result and the synchronization interrupt signals are transmitted to every clock in the distributed multiple clock system.

The object of the invention is a fault tolerant distributed multiple clock system having no master or central controller.

Another object of the invention is a distributed multiple clock system which can achieve synchronization from any initial state.

Still another object is that the clocks cooperate with each other to achieve synchronization.

A final object of the invention is a fault tolerant distributed multiple clock system which can achieve synchronization reliably within a determinable finite time period.

These and other objects of the invention will become apparent from a reading of the detailed description of the invention in conjunction with the drawings.

DETAILED DESCRIPTION OF THE INVENTION

Figure 1:
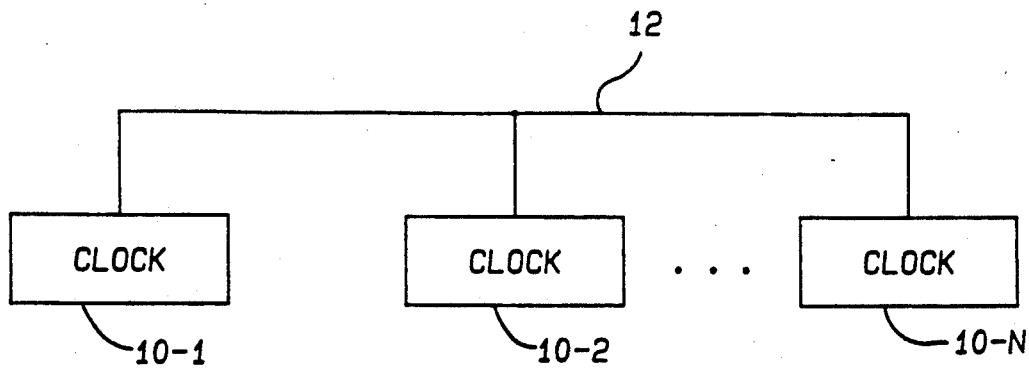
FIG. 1 is block diagram of a first embodiment of the distributed multiple clock system.
Figure 2:
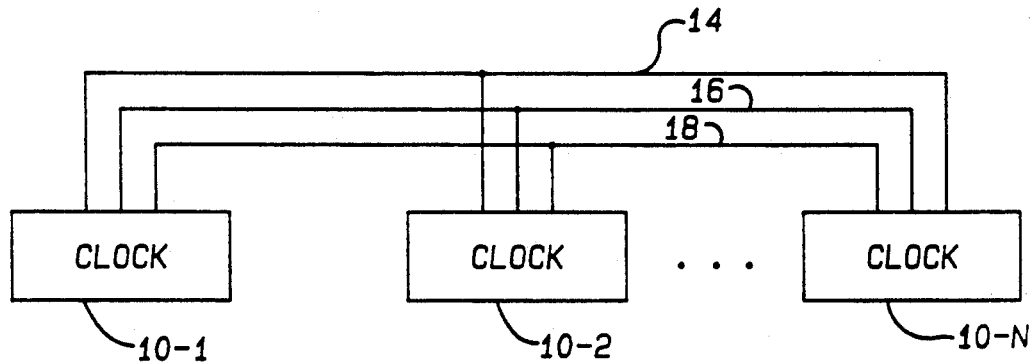
FIG. 2 is a block diagram of a second embodiment of the distributed multiple clock system.

As shown in FIG. 1, the distributed clock system consists of a plurality of clocks 10-1 through 10-N. The plurality of clocks 10-1 through 10-N may be connected to a common bus 12, as shown in FIG. 1, or the plurality of clocks 10-1 through 10-N may be connected to each other by means of three dedicated communication lines 14, 16 and 18, as shown in FIG. 2. The bus 12 or the dedicated communication lines 14, 16 and 18 communicate the signals used in the synchronization of the plurality of clocks. As shall be explained later, these signals may be generated by any clock or clocks of the plurality of clocks 10-1 through 10-N.

Figure 3:
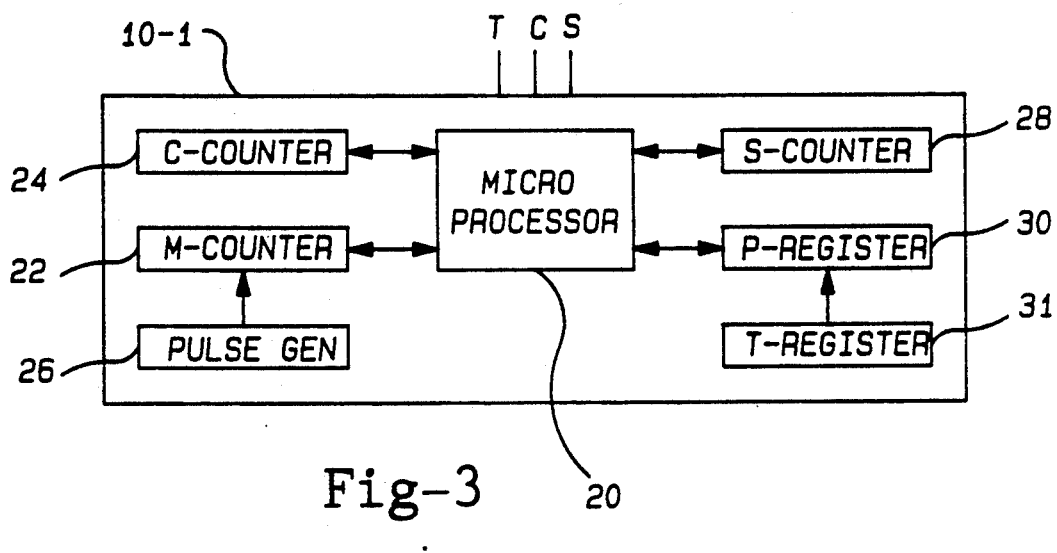
FIG. 3 is a block diagram showing the major components of each clock.

As shown in FIG. 3, each clock, such as clock 10-1, has a microprocessor 20, an M-counter 22 which stores the number of pulses, a C-counter 24 which stores a polling request signal, an S-counter which stores a number which corresponds to the number of clocks which disagree with the clock which generated the polling request signal, a P-register which stores a signal indicative of whether that particular clock is active or inactive and a T-register 31 which is set to one signifying the end of sampling or clock period. The M-counter 22 is preferably a modulo M-counter where M is the maximum number of counts and $M+1=0$.

The microprocessor 20 will generate three (3) signals used in the synchronization of the distributed clock system. These three signals are communicated to every clock in the system, either by means of a common bus 12, as shown in FIG. 1, or by means of the three dedicated communication lines 14, 16 and 18, as shown in FIG. 2. In the embodiment shown in FIG. 2, each communication line is dedicated to only one of the three signals communicated between the plurality of clocks 10-1 through 10-N. The clock pulses which are counted by the M-counter 22 may be generated by the microprocessor 20 or by a separate timing pulse generator, such as pulse generator 26.

The three signals used to synchronize the distributed clocks 10-1 through 10-N are as follows: synchronization interrupt signal "T".

The synchronization interrupt signal is generated by the first active clock whose M-counter 22 reaches a predetermined number of count N signifying the end of a sampling or clock period. This synchronization interrupt signal causes each clock to reset its M-counter to zero (0).

polling request signal C. The polling request signal is generated by the first clock whose M-counter 22 reaches a number of count K which precedes the predetermined count number N by a fixed number of counts k such that $K=N-k$. The polling request signal causes each clock in the system to compare the number of counts in its own M-counter 22 with the number K to generate a difference count D. The occurrence of a polling request signal is stored in the C- or polling request counter 24 of each clock.

polling result signal S. The polling result signal is generated by each clock when its difference count D is greater than a predetermined reference count d. The polling result signal S signifies that each clock that generates a polling result signal S disagrees, or is not in synchronization with, the clock that generated the polling request signal C. The number of polling result signals S generated after each polling request signal is stored in a S— or polling result counter 28 in each clock. The number of polling result signals stored in the S-counter 28 is indicative of the number of clocks which disagree with the clock that generated a polling request signal.

Figure 4:
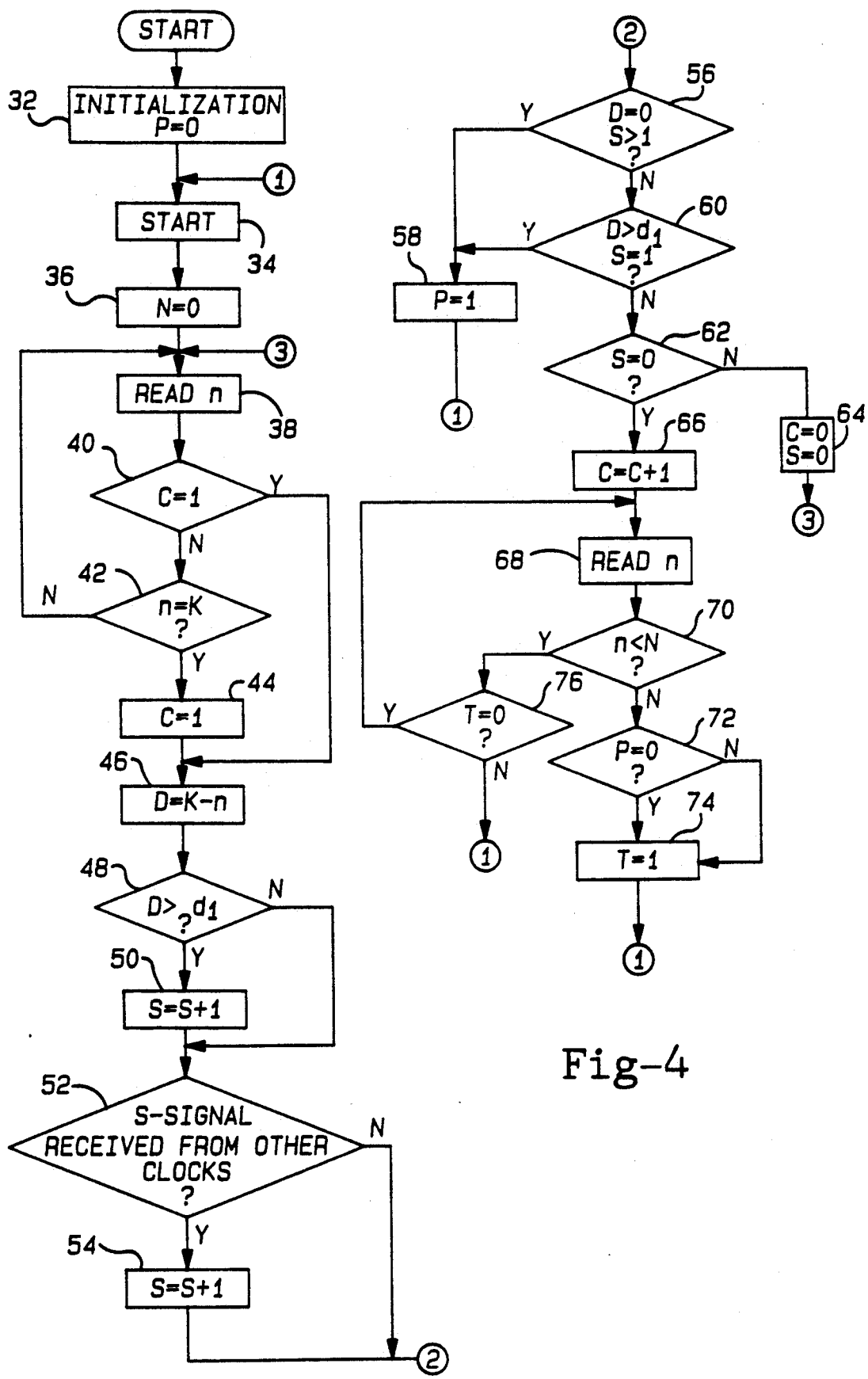
FIG. 4 is a flow diagram showing the basic operational routine of each clock.
Figure 5:
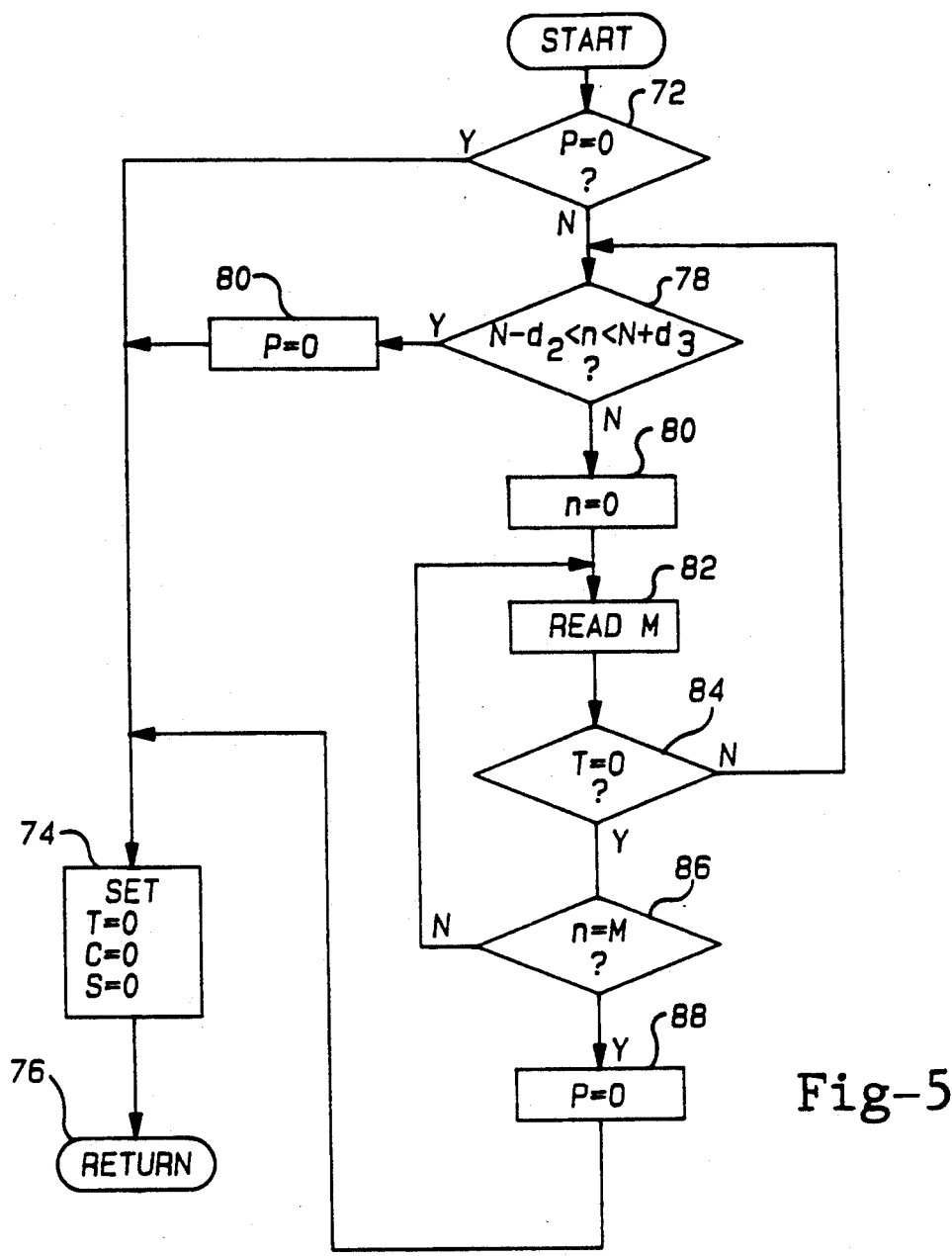
FIG. 5 is a flow diagram showing the operation of the start subroutine.
Figure 6:
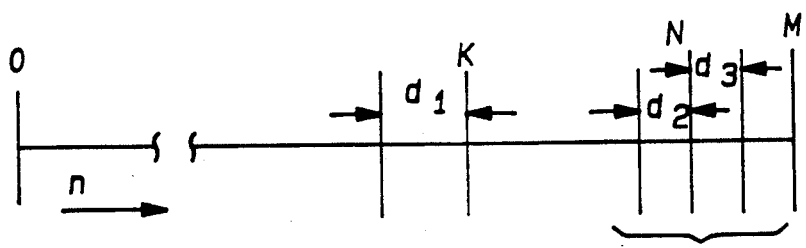
FIG. 6 shows the time sequence of the major timing events used in the distributed clock system.

The operation of the distributed clock system will be discussed relative to the flow diagrams shown in FIGS. 4 and 5. The operation will first be described relative to the flow diagram of FIG. 4, in which at least a majority of the clocks are assumed to be synchronized with each other. The active clocks are indicated by the state of an active/inactive or P-register 30, active clocks are indicated by the state $P=0$ while the inactive clocks are indicated by the state $P=1$. The flow diagram of FIG. 4 represents the operation of each clock in the distributed clock system. In a practical application, the value of M, N, K, $d_1$, $d_2$ and $d_3$ as shown in FIG. 6 are as follows: $M=1040$, $N=1020$, $K=1000$, $d_1=20$, $d_2$ and $d_3=10$ and the interval $N-d_2 \geq n \geq N+d_3$ is the readmittance limit used to readmit inactive clocks back into the distributed clock system after the generation of a synchronization interrupt signal T.

The routine executed by each clock 10-1 through 10-N in the distributed clock system is a repetitive closed loop process as indicated.

The initialization of the clock, indicated by block 32, is executed when the clock is started. This may be when the whole system is powered up, or by each new clock as it enters the system. During the initialization of the clock, the P-register 30 is set equal to zero, i.e. $P=0$, signifying it is an active clock. After the system has been started, a start subroutine, block 34, is executed by each clock. As shall be discussed relative to the start subroutine, shown in FIG. 5, the start subroutine, block 34, will set a synchronization interrupt or T register 31 to zero, the C-counter 24 to zero, and the S-counter 28 to zero for all active clocks which have a zero in its P-register 30. After the execution of the start subroutine, block 34, the microprocessor 20 in each active clock will set the number of counts, n, in its M-counter 22 to zero, i.e. $n=0$, as indicated by block 36. Subsequently, the M-counter 22 is periodically incremented, $n=n+1$, by either the microprocessor 20 or a pulse generator 26. The M-counter value n is read as indicated by block 38. The microprocessor 20 will inquire, decision block 40, if the content of the C-counter 24 is equal to one, indicating another clock has generated a polling request signal C. If $C=1$, then the microprocessor 20 will proceed to calculate the difference D, as indicated by block 46, which is the difference between the number of counts n in its own M-counter and the number K. As previously indicated, the first clock whose M-counter 22 reaches K counts will generate a polling request signal C which is stored in the C-counter 24 of each clock.

However, if $C=0$, the microprocessor 20 will proceed to inquire, decision block 42, if the number of counts n in its own M-counter 22 is equal to K. If n is not equal to K, the microprocessor 20 returns to block 38 and repeats this loop until either the number of counts in its M-counter 22 is equal to K, or another clock has generated a polling request signal. If $n=K$ in decision block 42, the microprocessor 20 will increment the polling request or C-counter, $C=1$, as indicated by block 44, then send a polling request signal to all of the other clocks in the system. The microprocessor 20 will then determine the value of D as indicated by block 46.

The value D is then compared with a first reference number of counts $d_1$ to determine if $D > d_1$, as indicated by decision block 48. The number of counts $d_1$ is a predetermined allowed deviation of the difference D from the value K determined in each clock. If $D > d_1$, then that particular clock disagrees with the clock that generated the polling request signal, and it increments its polling result or S-counter 28 as indicated in block 50 then sends a polling result signal S to every other clock in the system. If D is less than $d_1$ or the S-counter 28 has been incremented as indicated by block 50, the microprocessor 20 will inquire, decision block 52, if polling result signals S have been received from other clocks. If so, the microprocessor 20 will increment the S-counter 28 for each received polling result signal received, as indicated by block 54. The content of the S-counter 28 is the number of clocks that disagree with the clock that generated the polling request signal C.

The microprocessor 20 will now determine if the clock is to remain active (P=0) or whether it should place itself inactive (P=1). As indicated in decision block 56, the microprocessor will inquire if D=0 and if S is greater than one. D=0 signifies it is the clock that sent the polling request signal C and, if more than one clock disagrees with it, the microprocessor 20 concludes it is out of synchronization with the rest of the clocks and places itself inactive by setting the active/inactive or P-register 30 to one, as indicated by block 58. The microprocessor 20 will then return to the start subroutine 34. If D is not equal to zero or S is not greater than one, the microprocessor 20 will inquire, as indicated in decision block 60, if D is greater than $d_1$ and S=1. This signifies that it is the only clock that disagrees with the clock that generated the polling request signal C. If $D>d_1$ and S=1, the microprocessor 20 concludes that it is the only clock out of synchronization with the other clocks and will place itself inactive by setting its P-register 30 to one, as indicated in block 58, then return to the start subroutine indicated by block 34.

If neither of the simultaneous states of the D and the S-counter, set forth in decision blocks 56 and 60 exist, the microprocessor 20 will inquire, decision block 62, if the content of the S-counter 28 is zero signifying all of the remaining active clocks in the system are synchronized within $d_1$ counts of each other. If this is true, the microprocessor 20 will increment the C-counter 24 as indicated in block 66, then generate a second polling signal C to all of the other clocks. The second polling signal increments of the C-counter 24 in each active clock to two, which inhibits the generation of a polling request signal by any other active clock in the system.

However, if S is not equal to zero, then the C-counter 24 and S-counter 28 are reset to zero as indicated by 64. This signifies that the clock that generated the first polling request signal was out of synchronization with the rest of the clocks and therefore is to be ignored. After resetting C=0 and S=0, the microprocessor 20 returns to block 38 and continues to read the M-counter 22 until the count in one of the active clocks reaches K counts and a new polling request signal C is generated.

After incrementing the C-counter 24 to 2 as indicated in block 66, the microprocessor 20 will read the M-counter to obtain the value of n, as indicated by block 68, then inquire, decision block 70, if the count n is equal to N, signifying the end of the clock period. The first active clock, P=0, whose count n is equal to N will set its T-register 31 to 1 as indicated by decision block 72 and block 74 and generate a synchronization interrupt signal T, signifying the end of the clock period. The synchronization interrupt signal T is sent to each clock in the system. In response to the generation of the synchronization interrupt signal T, the microprocessor 20 in each clock will return to the start subroutine, block 34, and initiate a new clock period.

In the intervening period between n=K and n=N, the microprocessor 20 will inquire, decision block 76, if any other clock has generated a synchronization interrupt signal T. As long as n<N and T=0, the microprocessor will continue to read n, as indicated by block 68. If n=N before any other clock, as indicated by P=0 in block 72, the microprocessor will set T=1, as indicated by block 74, and return to START, block 34. Alternatively, if another clock generates a synchronization interrupt signal T=1 before n=N the microprocessor, as indicated by decision block 76, will return to block 34 prior to the content of the M-counter reaching N via the No branch of decision block 76.

As indicated before, after the content of the C-counter 24 is incremented to 2, no active clock can generate a polling request signal C and therefore no new polling result signals will be generated during this final interval of the clock period.

The details of the start subroutine 34 will now be described with reference to FIG. 5. The start subroutine 34 begins with the microprocessor 20 inquiring decision 72 if the clock is active (P=0) or inactive (P=1). If the clock is active (P=0), the microprocessor 20 proceeds to set T=0, C=0 and S=0 as indicated in block 74 then returns, block 76, to the routine shown in FIG. 4 beginning with block 36. However, if P=1 indicating the clock is inactive, the microprocessor 20 will inquire, block 78, if the count n in its M-register 22 is greater than $N-d_2$ and less than $N+d_3$ where $d_2$ and $d_3$ are predetermined reference number of counts. In the given example $d_2=d_3=10$ and $d_2$ and $d_3$ may have different values as required for efficient operation of the distributed clock system. The count range $N-d_2<n<N+d_3$ is a readmittance count range for the distributed clock system. If the count n in the M-counter 22 of an inactive clock is within the readmittance count range at the beginning of the start subroutine 34, the P-register 30 is set to zero as indicated by block 80 and its T-register 31, C-counter 24 and S-counter 28 are set to zero as indicated by block 74. If n is not within the readmittance range, the M-counter 22 is set to zero, as indicated in block 80. The pulse generator 26 will then continue to increment the M-counter 22 and the microprocessor will read the content n of the M-counter as indicated by block 82. After reading the M-counter, the microprocessor 20 will then inquire, decision block 84, if one of the active clocks has generated a synchronization interrupt signal T. If a synchronization interrupt signal has been generated, then T=1 and the microprocessor will return to decision block 78 and determine if the content of its M-counter is within the readmittance range, $N-d_2<n<N+d_3$. As previously indicated, if the content of the M-counter 22 is within the readmittance range, the microprocessor 20 will set P=0 and the clock will become active. Otherwise, the microprocessor 20 will set the content of the M-counter 22 to zero, as indicated by block 80, and it will again start counting.

However, if no active clock generates a synchronization interrupt signal T, the microprocessor 20 will inquire, decision block 86, if the content n of the M-counter 22 is M counts. If so, M-counter being a modulo M-counter will automatically roll over to zero, and the microprocessor will set P=0 and the clock will assume an active state. If the content n of the M-counter 22 is not equal to M, the microprocessor 20 will return to block 82 and continue reading the content of the M-counter until one of the active clocks generates a synchronization interrupt signal T or the content of the modulo M-counter reaches M counts. This avoids a potential deadlock situation, if for any reason all of the clocks declare themselves to be inactive. This assures that after a period of time one or more of the clocks will return to an active status.

When the distributed clock system is powered up for the first time, or any time after it has been deactivated, the content of the M-counters 22 may have any initial count from zero to M inclusive. In the initialization, block 32 of FIG. 4, the P-register 30 in each clock is set to zero making all of the clocks active. In the start subroutine, block 34, the T-register 31, the C-counter 24 and the S-counter 28 in each clock will be set to zero. It is unlikely that the first clock to generate a polling request signal C will find total system agreement (S=0). clocks will progress to the polling value and successively become inactive until there are only two active clocks remaining in the system. Either these two clocks can agree that they are within $d_1$ counts of each other or they can disagree, decision block 48. If they agree, the entire distributed clock system will resynchronize to agree with them. However, if they disagree, $D>d_1$, the slower of the two clocks will declare itself inactive (P=1) in response to decision block 60 where the microprocessor inquires if it is the only clock (S=1) that disagrees with the clock that generated the polling request signal. The remaining active clock will then proceed to generate a synchronization interrupt signal T when the content of its M-counter reaches M counts.

As previously indicated in the discussion of the start subroutine 32, if the only remaining active clock never generates a synchronization interrupt signal T, one or more of the clocks that previously declared themselves to be inactive will return to the active status when the content n of their M-counter 22 reaches M counts.

In a practical application of the distributed clock system, by the end of the first sample or clock period after power-up, at least one clock will generate a synchronization interrupt signal T. All of the clocks will then check their active or inactive status, then reset their M-counters 22 to zero. By the end of the second sample period, most of the inactive clocks should fall within the readmittance tolerance, $N-d_2<n<N+d_3$, and become active again.

As is evident from the detailed description, the distributed clock system is based on a process in which synchronization is determined by the fastest clock. Near the end of each timing period, the active clocks "vote" to determine if synchronization has been achieved. If any one active clock disagrees with the clock that generated the polling request signal C, the remaining active clocks will conclude that synchronization with the fastest clock was not achieved, as indicated by decision block 62, and they will reset their C-counters 24 and their S-counters 28 to zero and wait for the next fastest clock to generate a polling request signal. This process will continue until all of the active clocks agree that synchronization has been achieved.

It is also to be noted all clocks may be started with content of their M-counters 22 in any initial state and will achieve synchronization within a determinable finite time. Thereafter the system will maintain synchronization, despite drift in any of the clocks.

The advantage of the distributed clock system is that there is no central control; the system can achieve synchronization from any initial state and, since individual clocks cooperate to synchronize, there is no single point failure, therefore the distributed clock system is fault tolerant.

It is not intended that the distributed clock system be limited to the structure shown in the drawings or method of operation described herein. It is recognized that those skilled in the art may make changes to the structure or the operating procedures of the distributed clock system within the spirit of the invention described herein and set forth in the appended claims.

What is claimed is:

1. A distributed multiple clock system wherein each clock comprises:

means for generating clock pulses;

means for generating a polling request signal sent to each clock in said multiple clock system in response to receiving a first predetermined number of clock pulses;

means for generating a difference number equal to a difference between said first predetermined number of clock pulses and a number of clock pulses generated by said means for generating clock pulses in response to any one of said clocks in said distributed multiple clock system generating said polling request signal;

means for generating a polling result signal sent to each clock in said distributed multiple clock system in response to said different number exceeding a first reference number;

first means for placing said clock that generated said polling request signal rom an active state to an inactive state in response to said difference number being equal to zero and more than one clock in said distributed clock system generating a polling result signal, said clock in said inactive state being temporarily removed from participating in determining an end of a clock period;

second means for placing said clock from said active state to said inactive state in response to said difference number being greater than said first reference number and said clock being an only clock that generated a polling result signal;

means for detecting said difference number being less than said first reference number and at least one clock of said distributed multiple clock system having generated said polling request signal to cancel said polling request signal and said polling results signal in each clock in said active state;

means for generating a synchronization interrupt signal sent to all of the clocks in said distributed clock system signifying an end of said clock period in response to said clock being in said active state and said means for generating clock pulses generates a second predetermined number of clock pulses; and start means for initializing said clock for a beginning of a new clock period in response to receiving said synchronization interrupt signal generated by any clock in said distributed multiple clock system.

2. The distributed multiple clock system of claim 1 wherein said means for generating a polling request signal comprises:

a first counter for counting said clock pulses;

means for resetting said counter to zero counts in response to said initialization;

means for indexing said counter in response to each clock pulse;

means for generating said polling request signal in response to the number of counts in said first counter being indexed to said first predetermined number of clock pulses; and a polling request counter switchable from a first state to a second state in response to a first occurrence of said polling request signal generated by any clock in said distributed multiple clock system.

3. The distributed multiple clock system of claim 2 wherein said means for generating a polling result signal comprises:

means for comparing said difference number to said first reference number to generate said polling result signal when said difference number is greater than said first reference number; and a polling result counter incremented in response to each polling result signal generated by any clock in said distributed multiple clock system, said polling result counter storing a number corresponding to the number of clocks in said distributed multiple clock system which generated said polling result signal in response to said polling request signal.

4. The distributed multiple clock system of claim 3 wherein said clock has an active/inactive register having a first state indicating the clock is in said active state and a second state indicating said clock is in said inactive state, said first and second means for placing said clock in said inactive state, set said active/inactive register from said first state to said second state.

5. The distributed multiple clock system of claim 4, wherein said means for detecting includes means responsive to said active/inactive register being in said first state and the content of said polling result counter being not equal to zero to switch said polling request counter to said first state and set said polling result counter to zero signifying that synchronization was not achieved in response to said generated polling request signal.

6. The distributed multiple clock system of claim 5 wherein said means for generating a synchronization interrupt signal comprises:

means responsive to said active/inactive register being in said first state and the content of said first counter being equal to said second predetermined number of counts to generate said synchronization interrupt signal; and a synchronization interrupt register having a first state indicating that a synchronization interrupt signal has not been generated by any clock in said distributed multiple clock system and a second state in response to any clock in said distributed multiple clock system generating said synchronization interrupt signal.

7. The distributed multiple clock system of claim 6 wherein said first counter is a modulo M-counter which automatically rolls over to zero counts after receiving M number of clock pulses.

8. The distributed multiple clock system of claim 7 wherein said start means includes means for setting said polling request counter to said first state, said polling result counter to zero, and said synchronization interrupt register to said first state in response to said active/inactive register being in said first state and said generation of said synchronization interrupt signal by any clock in said distributed multiple clock system.

9. The distributed multiple clock system of claim 8 wherein said start means further includes means responsive to said active/inactive register being in said second state and said content of said first counter being between predetermined readmittance limits to set said active/inactive register to said first state readmitting said clock to an active status, said predetermined readmittance limits being a predetermined number of counts each side of said second predetermined number of pulses.

10. The distributed multiple clock system of claim 9 wherein said predetermined readmittance limits are $N-d_1 \geq n \geq N+d_2$ wherein:

N = said second predetermined number of counts;
n = the current number of counts in said first register; and $d_1$ and $d_2$ are predetermined numbers of counts either side of N which determine said readmittance limits, said predetermined number of counts $d_2$ and $d_3$ being allowed deviations of said count number n from said second predetermined number N.

11. The distributed multiple clock system of claim 9 wherein said start means further includes means responsive to said active/inactive register being in said second state and said content of said modulo M-counter being equal to M to set said active/inactive register to said first state readmitting said clock to an active status.

12. The distributed multiple clock system of claim 10 further including initialization means responsive to a first application of electrical power for setting said active/inactive register to said first state so that said clock starts in an active state.

13. A distributed clock system having at least two clocks, wherein each clock comprises:

means for periodically generating clock pulses;

a first counter for counting said clock pulses to generate a count number n;

a polling request counter having a first state and switchable to a second state in response to a polling request signal;

means for generating said polling request signal in response to said count number n being equal to a predetermined number of counts K and said polling request counter being in said first state, said polling request signal being transmitted to every clock in said distributed clock system;

means responsive to said generation of said polling request signal by any clock in said distributed clock system to increment said polling request counter from said first state to said second state;

a polling result counter;

means responsive to said polling request counter being incremented to said second state for generating a difference count D between said first predetermined number of counts K and said count number n to generate a polling result signal when said difference count D is greater than a first reference number of counts $d_1$;

means for incrementing said polling result counter in response to each polling result signal generated by each clock in said distributed clock system, said polling result counter storing a number corresponding to the number of clocks which generated said polling result signal;

means for storing a state of said clock, said means for storing having an active state when said clock is active and an inactive state when said clock is inactive;

means responsive to said difference count being zero and said number stored in said polling result counter being greater than one for setting and means for storing a state of said clock to said inactive state;

means responsive to said difference count D being greater than said first reference number of counts $d_1$ and said number stored in said polling result counter being one for setting said means for storing a state of said clock to said inactive state placing said clock inactive;

means responsive to the generation of said polling request signal and to said number in said polling result counter being zero for prohibiting the generation of any further polling request signals;

means responsive to said number stored in said polling result counter being not equal to zero for resetting said polling request counter to said first state and said polling result counter to zero;

means responsive to the content of said polling result counter being zero, said means for storing a state of said clock being in an active state and the content of said first counter being equal to a second predetermined number N for generating a synchronization interrupt signal indicating the end of a clock period, said synchronization interrupt signal being sent to every clock in said distributed clock system;

a synchronization interrupt register having a first state prior to the generating of said synchronization interrupt signal and a second state in response to any clock in said distributed clock system generating said synchronization interrupt signal; and start means for initializing said clock for the beginning of a new clock period in response to said synchronization register being set to said second state by a synchronization interrupt signal being generated by any clock in said distributed multiple clock system.

14. The distributed multiple clock system of claim 13 wherein said start means includes means responsive to said synchronization interrupt register being set to said second state and said means for storing said state of said clock being in said first state for setting said polling request counter to said first state, said polling result counter to zero and said synchronization interrupt register to said first state.

15. The distributed multiple clock system of claim 14 wherein said start means includes means responsive to said means for storing the state of said clock being in said inactive state and said count number n of said first counter being between predetermined readmittance count limits for setting said means for storing the state of said clock to said active state readmitting said clock as an active clock in said distributed multiple clock system.

16. The distributed multiple clock system of claim 15, wherein said predetermined readmittance count limits are $N-d_2 \geq n \geq N+d_3$ where $d_2$ and $d_3$ are second and third predetermined reference numbers defining said readmittance count limits about said second predetermined count number N.

17. The distributed clock system of claim 15 wherein said first counter is a module M-counter in which said count number n automatically rolls over to zero when said count number n=M counts.

18. The distributed clock system of claim 17 further including means for setting said means for storing the state of said clock to said active state in response to said means for storing the state of said clock being in said inactive state and said count number n=M counts.

19. The distributed multiple clock system of claim 13 further including initialization means responsive to a first application of electrical power for setting said means for storing the state of said clock to said active state so that said clock starts in said active state.

20. A method of operation of a distributed multiple clock system, said method for each clock of said clock system comprising the steps of:

counting in a first counter a number of clock pulses generated by a clock pulse generator to generate a count number n;

detecting when said count number n is equal to a first predetermined number of counts K and a first state of a polling request counter signifying no other clock in said clock system has generated a polling request signal to generate said polling request signal;

transmitting said polling request signal to every clock in said clock system;

activating said polling request counter to a second state in response to said polling request signal;

subtracting said count number n in said first counter from a first predetermined number of counts K to generate a difference number D in response to said polling request counter being activated to said second state;

comparing said difference number d to a first reference number $d_1$ to generate a polling result signal when said difference number D is greater than said first reference number $d_1$;

transmitting said polling result signal to each clock in said clock system;

storing in a polling result counter a number corresponding to the number of clocks which transmitted said polling result signal;

detecting when said difference number D is equal to zero and said number in said polling result counter is greater than one to set an active/inactive register from an active state to an inactive state;

detecting said difference number D being greater than said first reference number $d_1$ and said number stored in said polling result counter being equal to one to set said active/inactive register to said inactive state;

detecting said difference number D being less than said first reference number $d_1$ and said number stored in said polling result counter being greater than zero to activate said polling request counter to said first state and to reset the content of said polling result counter to zero;

detecting when said count number n is equal to a second predetermined number N and said active/inactive register being in said active state to generate a synchronization interrupt signal;

transmitting said synchronization interrupt signal to every clock in said clock system; and activating an interrupt register from a first state indicating an absence of said synchronization interrupt signal to a second state indicating said synchronization interrupt signal has been generated in response to an occurrence of said synchronization interrupt signal;

resetting said polling request counter to said first state, said polling result counter to zero, and said interrupt register to said first state in response to said interrupt register being set to said second state an said active/inactive register being in said active state.

21. The method of claim 20 wherein said first counter is a modulo M-counter which automatically rolls said count number n to zero after counting up to M counts.

22. The method of claim 21 wherein said method further includes the step of setting said active/inactive register to said active state in response to activating said interrupt register to said second state and said count number n in said first counter being between predetermined readmittance count limits.

23. The method of claim 22 wherein said readmittance limits are $N-d_2 \geq n \geq N+d_3$ where $d_2$ and $d_3$ are a predetermined number of counts on opposite sides of said second predetermined number N respectively, said predetermined number of counts $d_2$ and $d_3$ are allowed deviations of said count number n from said second predetermined number N for efficient operation of said clock system.

24. The method of claim 22 wherein said method further includes the step of setting said active/inactive register to said active state in response to said count number n being equal to M counts in said modulo M-counter.

25. The method of claim 23 further including the step of setting said active/inactive register to said active state in response to a first application of electrical power.

* * * * *